(12) United States Patent
Hagen et al.

(10) Patent No.: US 7,114,552 B2
(45) Date of Patent: Oct. 3, 2006

(54) SPLIT MUTATOR SHAFT

(75) Inventors: Curt Hagen, Delavan, WI (US); Drew Van Norman, Whitewater, WI (US)

(73) Assignee: SPX Corporation, Charlotte, NC (US)

( * ) Notice: Subject to any disclaimer, the term of this patent is extended or adjusted under 35 U.S.C. 154(b) by 218 days.

(21) Appl. No.: 10/866,818

(22) Filed: Jun. 15, 2004

(65) Prior Publication Data

US 2005/0277478 A1   Dec. 15, 2005

(51) Int. Cl.
*B23P 11/00* (2006.01)
*B23P 17/00* (2006.01)
*F16C 3/00* (2006.01)
*F26C 1/14* (2006.01)
*F28F 17/00* (2006.01)

(52) U.S. Cl. .................. 165/94; 29/525.01; 29/525.11

(58) Field of Classification Search ............................... 29/525.01–525.15; D15/82; 165/94; 464/179, 464/182; 62/354
See application file for complete search history.

(56) References Cited

U.S. PATENT DOCUMENTS

| 1,796,772 | A | * | 3/1931 | Henry | 165/94 |
| 2,402,931 | A | * | 6/1946 | Frank | 62/343 |
| 3,035,420 | A | * | 5/1962 | Stoelting et al. | 62/342 |
| 3,848,289 | A | * | 11/1974 | Bachmann | 15/246.5 |
| 4,274,269 | A | * | 6/1981 | Trabue | 464/70 |

* cited by examiner

*Primary Examiner*—David P. Bryant
*Assistant Examiner*—Christopher M. Koehler
(74) *Attorney, Agent, or Firm*—Baker & Hostetler LLP

(57) ABSTRACT

A method and apparatus for removing or inserting a mutator shaft from a scraped surface heat exchanger assembly comprising a split shaft design to form a plurality of mutator shaft segments. Each shaft segment contains ends further connectable with one another and may be further retained via a drive pin assembly preferably comprising a plurality of drive pin mounting screws and a drive pin. The shaft segments and drive pin assembly may be further sealed to provide a sanitary working environment particularly suitable for use in the foodstuff industry.

15 Claims, 4 Drawing Sheets

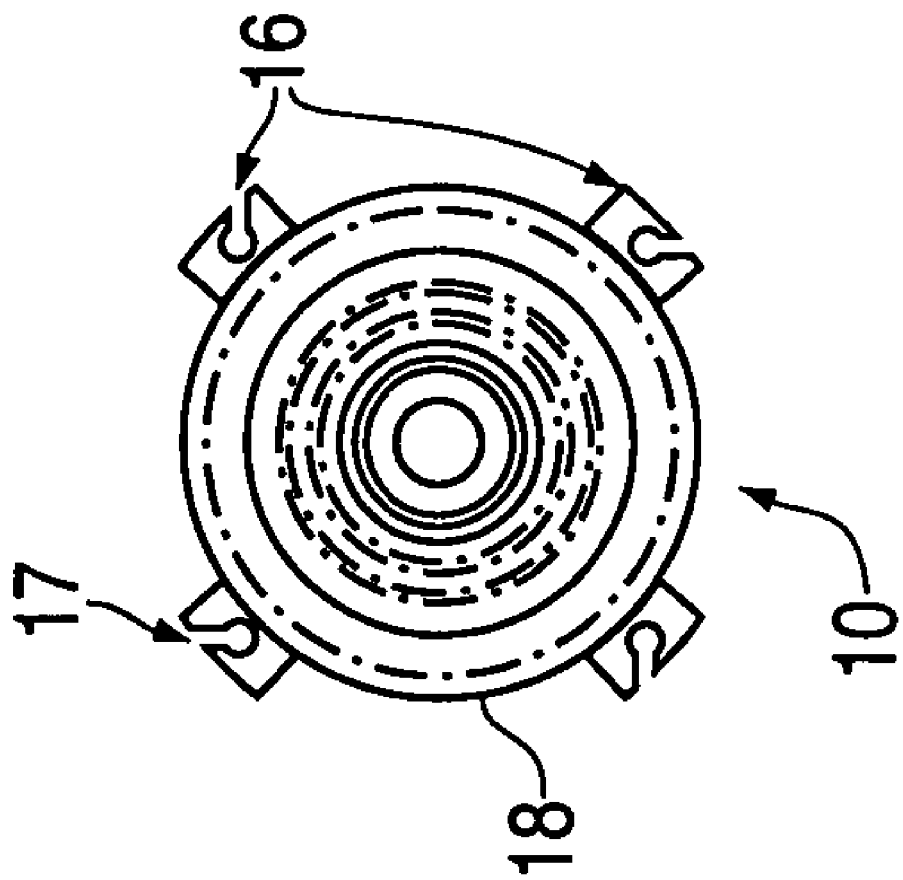

SPLIT MUTATOR SHAFT

FIELD OF THE INVENTION

The present invention relates generally to scraped surface heat exchangers. More particularly, the present invention relates to a method and apparatus for servicing scraped surface heat exchangers in limited vertical or horizontal positions.

BACKGROUND OF THE INVENTION

Scraped-surface heat exchangers are commonly utilized in aseptic processing of foodstuffs. These heat exchangers are preferred because of their capability to process heat-sensitive, viscous products, and minimize the extent of burn-on, or fouling on the heat transfer surface. Such heat exchangers are commonly marketed under the trade names, for example, Votator®, Thermutator®, Contherm®, and Terlotherm®. Waukesha Cherry-Burrell, Delavan, Wis., for example, manufactures such heat exchangers.

Scraped surface heat exchangers are particularly suitable for use in the foodstuff industry where they are used for refrigerating or heating of fatty products, bakery products, and dairy products such as margarine emulsion and ice cream. A heat exchanger of this type may include a cylindrical treatment chamber or product tube, a rotor such as a mutator shaft, arranged in the chamber and a number of blade rows including a number of successively arranged blade scrapers mounted on the rotor so as to make the blades scrape the inner surface of the chamber during operation. A refrigerant or a heating medium, e.g., ammonia, freon, glycol, hot water or steam, may be generally circulated on the outside of the treatment chamber and may further provide heat exchange by a conventional heat exchange process. A cylindrical treatment chamber or product tube is typically heated or cooled so that a treated product will undergo a change of temperature as it passes through the scraped surface heat exchanger. The treated product is generally introduced, in some embodiments, under pressure at one end of the heat exchanger and is generally designed to leave the heat exchanger at its opposite end. The scraping of the product off the inner surface of the chamber during its passage through the heat exchanger thereby provides a considerably improved heat transmission.

In a scraped surface heat exchanger, the inside of a product tube is scraped with blades mounted on the rotor or mutator shaft which rotates within the product tube. The product tubes, along with the mutator shafts, may be manufactured with different lengths to provide various heat exchanger areas. These units can be installed in either a horizontal or vertical position. At various times, it may be necessary to service the scraped surface heat exchanger, for instance, to replace mechanical seals, replace/inspect worn blades, or to clean the product tube area. To service the unit, access space must be provided to remove the mutator shaft from the product tube.

Typical product tube lengths may vary, for instance, from one to two feet or traverse greater lengths such as seven to nine feet. For longer length configurations, product tubes mounted in a vertical configuration require access space generally equal to the length of the product tube underneath the vertical unit of the scraped surface heat exchanger. In a horizontal configuration, access space, generally equal to the length of the product tube, is typically provided in front of a horizontal unit of the scraped surface heat exchanger. Thus, considerable space requirements can be necessary in either vertical or horizontal configurations requiring, for example, excessive ceiling heights or broad servicing lengths in order to allow shaft insertion/removal during scraped surface heat exchanger assembly/disassembly. This may provide difficulties for service technicians servicing such scraped surface heat exchangers.

Accordingly, it is desirable to provide a method and apparatus that can facilitate lower vertical and horizontal space requirements when servicing scraped surface heat exchangers.

SUMMARY OF THE INVENTION

The foregoing needs are met, to a great extent, by the present invention, wherein in one aspect a method and apparatus is provided that in some embodiments facilitates servicing scraped surface heat exchanges including reducing vertical and horizontal space requirements.

In accordance with one aspect of the present invention, a split mutator shaft is provided that, in some embodiments, includes a first shaft segment having a male insertion end and a second shaft segment having a female receptacle end to accommodate the male insertion end. The split mutator shaft may further include a drive pin, a first drive pin mounting screw, a second drive pin mounting screw, and a plurality of scraper blades located on an outer surface of the first shaft segment and the second shaft segment.

In accordance with another aspect of the present invention, a split mutator shaft is provided that, in some embodiments, includes a plurality of shaft segments having connectable ends and a plurality of drive pins inserted through the connectable ends of the shaft segments wherein each drive pin has two ends. The split mutator shaft may further include a plurality of drive pin mounting screws inserted through the connectable ends and further connected to a respective end of a drive pin. A plurality of scraper blades may also be mounted on an outer surface of the plurality of shaft segments.

In accordance with another aspect of the present invention, a method for removing a mutator shaft from a scraped surface heat exchanger assembly is provided that, in some embodiments, includes providing a split mutator shaft assembly comprising a first shaft segment and a second shaft segment. The method may further include removing the split mutator shaft assembly out from the scraped surface heat exchanger assembly a first distance to exposed connected ends, separating the first shaft segment from the second shaft segment, and removing a portion of the split mutator shaft assembly from the scraped surface heat exchanger assembly.

In accordance with yet another aspect of the present invention, a method for removing a mutator shaft from a scraped surface heat exchanger assembly is provided that, in some embodiments, includes providing a split mutator shaft comprising a plurality of shaft segments having connectable ends retained together by a drive pin assembly. The method may further include removing the split mutator shaft out from the scraped surface heat exchanger assembly a first distance, removing the drive pin assembly and separating one connectable end from another connectable end.

In accordance with still another aspect of the present invention, a method for assembling a mutator shaft in a scraped heat exchanger assembly is provided that, in some embodiments, includes providing a split mutator shaft comprising a first shaft segment having a first end and a second shaft segment having a second end wherein the first end is connectable to the second end. The method may further include inserting the first shaft segment a first distance into the scraped surface heat exchanger assembly prior to the first end, connecting the second end to the first end to form an assembled mutator shaft, and locating the assembled mutator shaft within the scraped surface heat exchanger assembly.

In accordance with another aspect of the present invention, a system for assembling or disassembling a component from a scraped surface heat exchanger assembly is provided that, in some embodiments, includes a means for rotating scraper blades and a means for retaining a first connecting means to a second connecting means.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is an end view of one end of the mutator shaft shown in FIG. 1.

DETAILED DESCRIPTION

Figure 1:
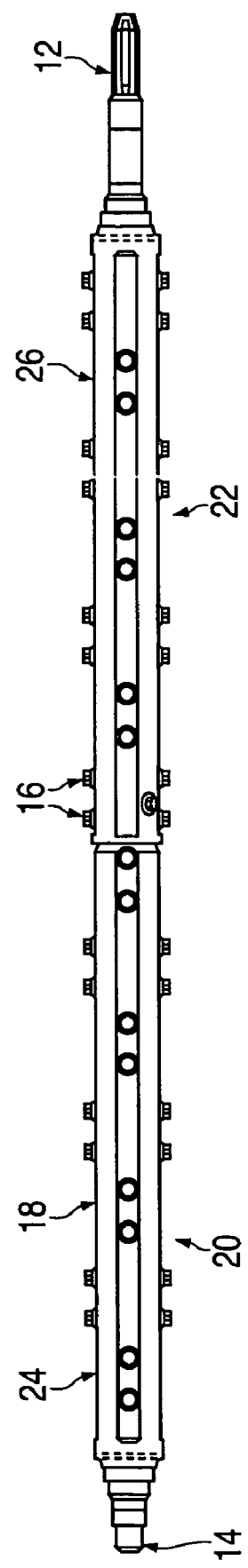
FIG. 1 is a side view illustrating split mutator shaft assembly according to a preferred embodiment of the invention.

An embodiment in accordance with the present invention provides a method and apparatus for use in a scraped surface heat exchanger which facilitates lower vertical or horizontal space requirements. The design of the apparatus splits the mutator shaft into at least two pieces to form a plurality of mutator shaft segments. The split is designed to maintain support of the shaft, transmit torque between the at least two mutator shaft segments, and be sealed for sanitary applications. Additionally, the split is designed to easily disconnect for service and allow removal of the plurality of mutator shaft segments. Reconnection of the split mutator shaft segments is designed to be performed with a minimum of parts to handle while minimizing costs. Preferred embodiments of the invention will now be described with reference to the drawing figures in which like reference numerals refer to like parts throughout.

An embodiment of the present inventive apparatus is illustrated in FIG. 1 wherein an assembled split mutator shaft 10 is shown. The split mutator shaft 10 may be comprised of stainless steel material such as 316-L stainless steel. Such material is conducive to providing a sanitary working environment particularly suitable for use in the foodstuff industry. In the embodiment depicted in FIG. 1, the split mutator shaft contains splines 12 at one end of the shaft and a roller bearing element 14 at the other end thereof. The splines 12, in direct connection with drive gears, facilitate rotation of the split mutator shaft 10.

A plurality of scraper blade mounting pins 16 are preferably located on an outer surface 18 of the split mutator shaft 10. The scraper blade mounting pins 16 are preferably welded to the outer surface 18 of the split mutator shaft 10. In a preferred design, the scraper blade mounting pins 16 hold and retain inserted scraper blades as provided, for example, by slots 17 shown in FIG. 4. Thus, in a preferred configuration, as the split mutator shaft 10 rotates, the scraper blade mounting pins 16 operate to receive and push inserted scraper blades to scrape a product off an inner surface of the chamber or product tube as a product traverses through the scraped surface heat exchanger assembly. The aforementioned assembly and method of scraping can provide a considerably improved heat transmission within the scraped surface heat exchanger assembly.

Figure 2:
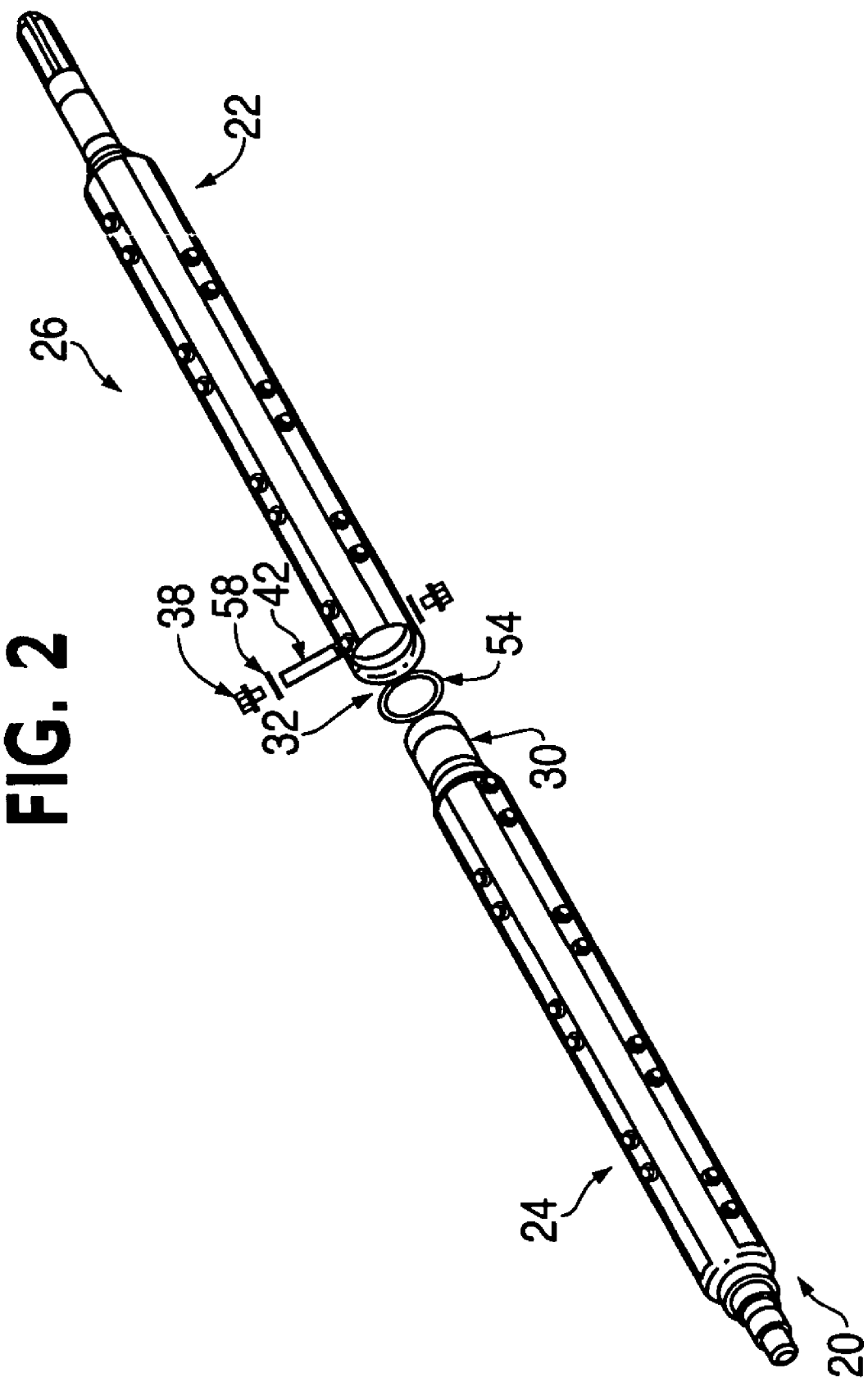
FIG. 2 is a perspective view illustrating a disassembled split mutator shaft according to a preferred embodiment of the invention.
Figure 3:
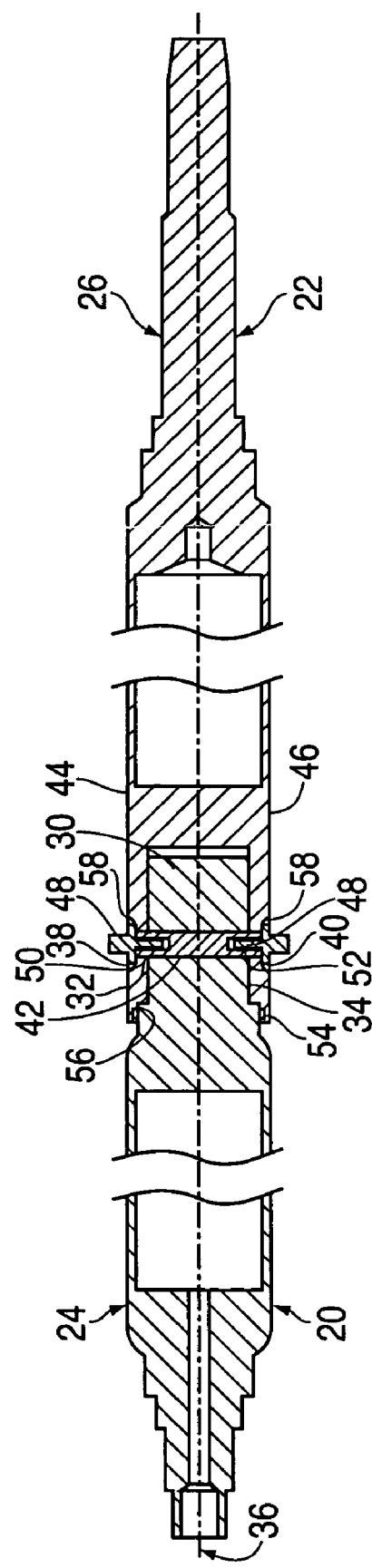
FIG. 3 is a cutaway view illustrating a portion of the split mutator shaft assembly of FIG. 1.

In a preferred embodiment, the split mutator shaft 10 is designed to comprise at least two pieces which form a plurality of mutator shaft segments 20, 22 as shown, for instance, in FIG. 2. In a state of assembly, each of the mutator shaft segments 20, 22 are joined together to form a unitary split mutator shaft 10. The mutator shaft segments 20, 22 may comprise a first segment 24 and a second segment 26, respectively. The first segment 24 is preferably designed with a male insertion end 30. The second segment 26 is preferably designed with a female receptacle end 32 to receive the male insertion end 30. FIG. 3, for example, shows the female receptacle end 32 accommodating the male insertion end 30 of the first segment 24 in close fit relation.

In a preferred design, the male insertion end 30 is configured to be retained within the female receptacle end 32 in close fit relation such as by sliding engagement. To retain the close fit relation, an insertion hole 34 is preferably designed to fully traverse the male insertion end 30 perpendicular to a longitudinal axis 36 thereof as depicted, for instance, in FIG. 3. The second segment 26 also has insertion holes 38, 40 in general alignment to receive an inserted drive pin 42 therethrough in a preferred embodiment. The insertion holes 38, 40 are located along the female receptacle end 32 of the second segment 26 through first and second outer surfaces 44, 46 respectively. An axis through the insertion holes 38, 40 is preferably located perpendicular to an axis 36 of the second segment 26. Thus, the location of the insertion hole 34 along the male insertion end 30 is preferably designed to align with the insertion holes 38, 40 located along the female receptacle end 32 in an assembled relation wherein the male insertion end 30 is fully inserted within the female receptacle end 32.

In the aforementioned assembled relation, a drive pin 42 is preferably inserted through and located within the insertion hole 34 of the male insertion end 30 and the insertion holes 38, 40 of the female receptacle end 32. A preferred material of the drive pin 42 includes 17-4PH Stainless Steel.

Such material is conducive to providing a sanitary working environment particularly suitable for use in the foodstuff industry. The drive pin 42 is preferably designed to accept drive pin mounting screws 48 located at ends 50, 52 of the drive pin 42. The drive pin mounting screws 48 may be retained to the drive pin 42, for instance, via threaded fit connection.

Thus, the split configuration of the split mutator shaft 10 effectively reduces the amount of service area required to remove or assemble the split mutator shaft 10 from or to an assembly of the scraped surface heat exchanger. A full length clearance of the entire split mutator shaft 10 is no longer necessary for removal or assembly processes. The split mutator shaft 10 design works for either vertical or horizontal assemblies and conserves space in either configuration.

For example, during removal, the split mutator shaft 10 may be pulled out of the scraped surface heat exchanger to reveal the drive pin mounting screws 48 at a first distance. The drive pin mounting screws 48 may be removed from the drive pin 42, and the split mutator shaft 10 may be further disassembled at the aforementioned first distance. This feature reduces a necessity to fully remove the mutator shaft from a scraped surface heat exchanger assembly. Hence, the additional space requirements which would otherwise be required to fully clear the mutator shaft from the scraped heat exchanger assembly is preserved and/or altogether eliminated by the improved design of the split mutator shaft 10 of the present invention.

Alternatively, during an assembly process, a portion of the split mutator shaft 10 may be inserted directly into place within the scraped surface heat exchanger leaving an end of one mutator shaft segment exposed at a first distance. By way of example, this mutator shaft segment by comprise the first segment 24. Another mutator shaft segment, such as the second segment 26, may be subsequently connected to the first segment 24 at the aforementioned first distance. Accordingly, the male insertion end 30 of the first segment 24 is fitted within the female receptacle end 32 of the second segment 26 and retained thereto via the drive pin mounting screws 48 in connection with the fitted drive pin 42. Thus, the separate mutator shaft segments 20, 22 of the split mutator shaft 10 design reduces the necessity to traverse an entire length of mutator shaft when attempting to assemble the mutator shaft within a scraped surface heat exchanger assembly.

In order to facilitate an aseptic processing environment, the female receptacle end 32 and the male insertion end 30 are preferably sealed relative to one another. Such sealing may be accomplished using a shaft seal ring 54 which can be inserted over the male insertion end 30 to abut an inner surface 56 of the female receptacle end 32 during a full assembly of the first segment 24 with respect to the second segment 26. Additional sealing rings 58 are preferably provided at locations between the drive pin mounting screws 48 and the ends 50, 52 of the drive pin 42. Materials for the shaft seal ring 54 or the sealing rings 58 may include elastomers designed for use in sanitary conditions. Such elastomers may included, for example, flouroelastomers such as Viton® manufactured by Dupont. Alternatively the sealing rings may comprise other composite materials such as EPDM. Such materials are conducive to providing a sanitary working environment particularly suitable for use in the foodstuff industry.

Although an example of the split mutator shaft 10 is shown having two mutator shaft segments 20, 22, it will be appreciated that the split mutator shaft 10 may comprise additional segments, for instance, to reduce even further the amount of clearance space required for removing the split mutator shaft 10 from a scraped surface heat exchanger assembly. Additionally, the threaded connection of the drive pin mounting screws 48 with respect to the drive pin 42 is for exemplary purposes. Other connection types may be utilized to retain the drive pin mounting screws 48 within the drive pin 42. Likewise, the description of the sliding engagement of the male insertion end 30 with respect to the female receptacle end 32 is for exemplary purposes. Other engagement connection types may be utilized to fit the male insertion end 30 with respect to the female receptacle end 32.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A split mutator shaft for use with a scraped surface heat exchanger comprising:
    a first shaft segment having a male insertion end which comprises a first insertion hole through a portion of the male insertion end;
    a second shaft segment having a female receptacle end to accommodate the male insertion end, said female receptacle further comprising a second insertion hole and third insertion hole;
    a drive pin having two ends, said drive pin inserted through and in general alignment with the first insertion hole, the second insertion hole, and the third insertion hole;
    a first drive pin mounting screw inserted through the female receptacle end connected to one end of the drive pin;
    a second drive pin mounting screw inserted through the female receptacle end connected to the other end of the drive pin; and
    a plurality of scraper blade mounting pins for retaining scraper blades mounted on an outer surface of the first shaft segment and the second shaft segment.

2. The split mutator shaft of claim 1, further comprising:
    a first seal ring provided over the male insertion end and mounted between a surface thereof and an inner surface of the female receptacle end.

3. The split mutator shaft of claim 2, further comprising:
    a second seal ring provided between the first drive pin mounting screw and one end of the drive pin; and p1 a third seal ring provided between the second drive pin mounting screw and the other end of the drive pin.

4. The split mutator shaft of claim 3, wherein the seal rings comprise elastomers designed for use in sanitary conditions.

5. The split mutator shaft of claim 1, wherein the first shaft segment, the second shaft segment, and the drive pin comprise stainless steel.

6. The split mutator shaft of claim 5, wherein the first shaft segment and the second shaft segment comprise 316-L stainless steel.

7. The split mutator shaft of claim 5, wherein the drive pin comprises 17-4PH stainless steel.

8. The split mutator shaft of claim 1, wherein the connection of the first drive pin mounting screw to one end of the drive pin is a threaded connection and the connection of the second drive pin mounting screw to the other end of the drive pin is a threaded connection.

9. A split mutator shaft for use with a scraped surface heat exchanger comprising:
- a first shaft segment having a male insertion end which comprises a first insertion hole through a portion of the male insertion end;
- a second shaft segment having a female receptacle end to accommodate the male insertion end, said female receptacle further comprising a second insertion hole and third insertion hole;
- a drive pin having two ends, said drive pin inserted through and in general alignment with the first insertion hole, the second insertion hole, and the third insertion hole;
- means for securing the drive pin in the first insertion hole, said securing means passing through the second and third insertion holes to secure the first and second shafts for common rotation; and
- a plurality of scraper blade mounting pins for retaining scraper blades mounted on an outer surface of the first shaft segment and the second shaft segment.

10. The split mutator shaft of claim 9, further comprising:
- a first seal ring provided over the male insertion end and mounted between a surface thereof and an inner surface of the female receptacle end.

11. The split mutator shaft of claim 10, wherein the seal rings comprise elastomers designed for use in sanitary conditions.

12. The split mutator shaft of claim 11, wherein the first shaft segment, the second shaft segment, and the drive pin comprise stainless steel.

13. The split mutator shaft of claim 9, wherein the first shaft segment and the second shaft segment comprise 316-L stainless steel.

14. The split mutator shaft of claim 12, wherein the drive pin comprises 17-4PH stainless steel.

15. The split mutator shaft of claim 9, wherein the connection of the first drive pin mounting screw to one end of the drive pin is a threaded connection and the connection of the second drive pin mounting screw to the other end of the drive pin is a threaded connection.

* * * * *

UNITED STATES PATENT AND TRADEMARK OFFICE
CERTIFICATE OF CORRECTION

PATENT NO. : 7,114,552 B2 Page 1 of 1
APPLICATION NO. : 10/866818
DATED : October 3, 2006
INVENTOR(S) : Curt Hagen et al.

It is certified that error appears in the above-identified patent and that said Letters Patent is hereby corrected as shown below:

<u>Column 6, Line 53</u>
Please delete "p1".

Signed and Sealed this

Twelfth Day of December, 2006

JON W. DUDAS
*Director of the United States Patent and Trademark Office*